2,960,534
N-(CHLOROSUBSTITUTED ARYL)-N' METHOXY-N'-METHYL UREAS

Otto Scherer and Paul Heller, Frankfurt am Main, Germany, assignors to Farbwerke Hoechst Aktiengesellschaft vormals Meister Lucius & Brüning, Frankfurt am Main, Germany, a corporation of Germany No Drawing. Filed June 11, 1957, Ser. No. 664,916

6 Claims. (Cl. 260—553)

It is already known to use substituted ureas, for example N - (para - chlorophenyl) - N',N' - dimethyl - urea (CMU) for combating weed. In addition, it is known to react phenyl isocyanate with O-alkyl-hydroxylamines (J. Am. Chem. Soc. 49, 1538 (1927)).

Now we have found that new urea derivatives which are distinguished as herbicides by a surprisingly rapid onset of action are obtained by reacting substituted phenyl isocyanates of the general formula

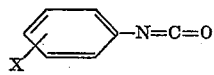

in which X stands for Cl or $CH_3$ and may be present several times, with compounds of the general formula

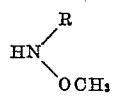

in which R represents hydrogen or $CH_3$.

As starting substances may be used: ortho-chlorophenyl-isocyanate, meta-chlorophenyl-isocyanate, para-chlorophenyl-isocyanate, 2,4-dichlorophenyl - isocyanate, 3,4 - dichlorophenyl - isocyanate, 2 - methyl - 4 - chlorophenyl-isocyanate and 2,4,5-trichlorophenyl-isocyanate.

For the reaction with the aforementioned isocyanates there may, for example, be used O-methyl-hydroxylamine and O,N-dimethyl-hydroxylamine.

The process according to the present invention can be carried out in a simple and clear manner by reacting the corresponding isocyanate with the corresponding hydroxylamine derivative, for example according to the following reaction scheme:

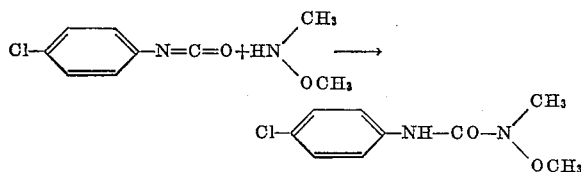

The operation may be carried out in the presence or absence of solvents. It can be of advantage to compensate by cooling the reaction heat produced. The reaction may be performed at room temperature or at a moderately raised temperature. For completion of the reaction, the reaction mixture is allowed to stand for some time.

The products obtained according to the process of the present invention are suitable for the destruction of plants and for the inhibition of undesired plant growth. Owing to their more rapid onset of action they are superior to the known urea derivatives.

When, for example, an aqueous suspension containing 0.25 to 1.0 gram of an agent that consists of 80% of N-(para-chlorophenyl)-N'-methyl - N' - methoxy - urea and 20% of a dispersing agent such as powder of staple fibers of regenerated cellulose, is brought on the surface of the earth in clay pots sown with charlock and oats, it is found that the charlock and oat seed was completely destroyed by this treatment.

When the same test is carried out in the post emergent process, that is to say when the above mentioned suspension in concentrations of 1.0–0.25 gram./m.$^2$ is poured on clay pots containing charlock and oat plants about 10 cm. high, the charlock plants are completely destroyed by this treatment. When using the suspension in a quantity of 1.0 gram per m.$^2$, the oat plants are completely destroyed, when using 0.5 gram per m.$^2$ they are almost completely destroyed and in the case of 0.25 gram per m.$^2$ they are so much injured that they decay in the course of time.

COMPARATIVE TEST

Test place: Test field Hattersheim.
Type of beans: St. Andreas.
Sowing: August 24, 1956.
Last valuation: October 1, 1956.

| Compound | Kg./hectare | Number of injured beans in percent when treating the soil | |
|---|---|---|---|
| | | 10 days before sowing | 1 day before sowing |
| A | 2 | 8 | 28 |
| A | 1 | 3 | 4 |
| CMU | 2 | 61 | 81.5 |
| CMU | 1 | 46 | 67 |

A = N-(para-chlorophenyl)-N'-(methyl)-N'-(methoxy)-urea.
CMU = N-(para-chlorophenyl)-N',N'-(dimethyl)-urea.

The following examples illustrate the invention, but they are not intended to limit it thereto:

Example 1

50 grams of freshly distilled para-chlorophenyl-isocyanate

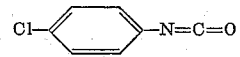

are dissolved in 100 ml. of benzene and, while shaking, admixed with a solution of 20 grams of O,N-dimethyl-hydroxylamine

in 100 ml. of benzene. The heat produced is compensated by cooling with ice water. After standing for 24 hours at room temperature, the reaction mixture is advantageously cooled with a freezing mixture of ice and sodium chloride in order to complete the crystallisation. The compound

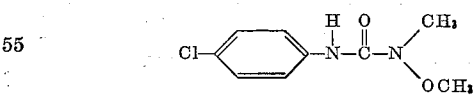

obtained in the form of crystals is then isolated by filtering with suction. After drying under reduced pressure, the colourless substance melts at 83–84° C. The yield amounts to 69 grams (98.5% of the theoretical yield).

Example 2

A solution of 7 grams of O-methyl-hydroxylamine in 30 ml. of benzene is added to a solution of 21 grams of para-chlorophenyl-isocyanate in 60 ml. of benzene. The yield of the compound N-(para-chlorophenyl)-N'-(methoxy)-urea

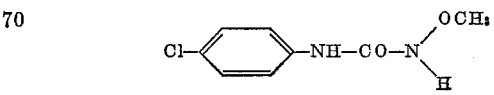

obtained in the form of crystals amounts to 26 grams =93% of the theoretical yield point: 139° C.

*Example 3*

While proceeding according to the process of Example 2, there are used 10.2 grams of O,N-dimethyl-hydroxylamine in 30 ml. of benzene and 37.1 grams of 2,4,5-trichlorophenyl-isocyanate in 100 ml. of benzene. The yield of the compound N-(2,4,5-trichlorophenyl)-N'-(methoxy)-N'-(methyl)-urea

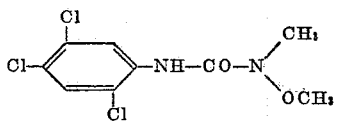

obtained in the form of crystals amounts to 34 grams =72% of the theoretical yield. Melting point: 196–197° C.

*Example 4*

While proceeding according to Example 2, there are used 10.2 grams of O,N-dimethyl-hydroxylamine in 30 ml. of benzene and 31.3 grams of 3,4-dichlorophenyl-isocyanate in 100 ml. of benzene. The strong reaction heat is reduced by cooling with ice. The yield of the compound N-(3,4-dichloro-phenyl)-N'-(methoxy)-N'-(methyl)-urea

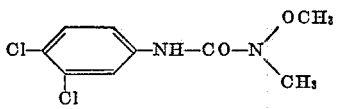

obtained in the form of crystals amounts to 32 grams =77% of the theoretical yield. Melting point: 92–93° C.

*Example 5*

While proceeding according to the preceding examples there are used 15.3 grams of O,N-dimethyl-hydroxylamine in 30 ml. of benzene and 41.7 grams of 2-methyl-4-chlorophenyl-isocyanate in 100 ml. of benzene. The strong reaction heat is reduced by cooling with ice. After evaporation of the solvent the yield of the compound N-(4-chloro-2-methyl-phenyl)-N'-(methoxy)-N'-(methyl)urea

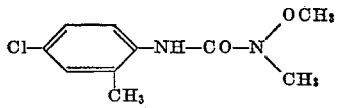

obtained in the form of crystals amounts to 40 grams =70% of the theoretical yield. Melting point: 66–67° C.

*Example 6*

While proceeding according to the preceding Examples there are used 15.3 grams of O,N-dimethyl-hydroxylamine and 38.4 grams of meta-chlorophenyl-isocyanate. The strong reaction heat is reduced by cooling with ice. The mixture solidifies. The yield of the compound N-(3-chlorophenyl)-N'-(methoxy)-N'-(methyl)-urea

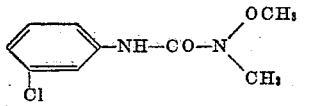

obtained in the form of crystals amounts to about 70% of the theoretical yield. Melting point: 105–106° C.

*Example 7*

When using O,N-dimethyl-hydroxylamine and 2,4-di-chloro-phenyl-isocyanate in accordance with the process of Examples 1–6, there is obtained the N-(2,4-dichloro-phenyl)-N'-(methoxy)-N'-(methyl)-urea

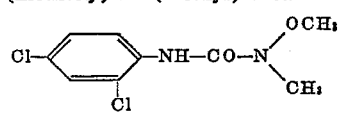

in a yield of 70%. Melting point: 44–46° C.

*Example 8*

When proceeding in accordance with the preceding examples and when using O,N-dimethyl-hydroxylamine and 2-chlorophenyl-isocyanate, there is obtained the N-(2-chlorophenyl)-N'-(methoxy)-N'-(methyl)-urea

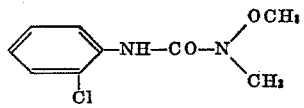

in a yield of 90% of the theoretical yield. The compound is liquid.

We claim:

1. A compound of the formula

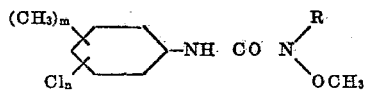

in which R stands for a member of the group consisting of H and $CH_3$, $m$ stands for an integer from 0 to 1, and $n$ stands for an integer from 1 to 3.

2. The compound of the formula

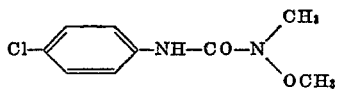

3. The compound of the formula

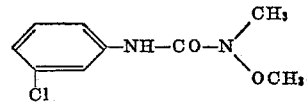

4. The compound of the formula

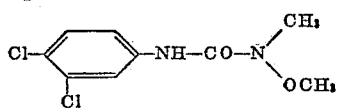

5. The compound of the formula

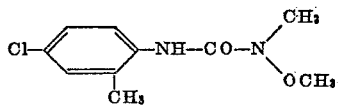

6. The compound of the formula

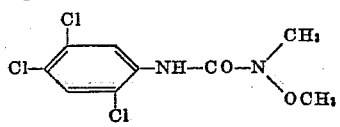

References Cited in the file of this patent

UNITED STATES PATENTS

| | | |
|---|---|---|
| 2,655,447 | Todd | Oct. 13, 1953 |
| 2,744,819 | Toorman | May 8, 1956 |
| 2,762,842 | Haflinger et al. | Sept. 11, 1956 |
| 2,817,684 | Bortnick et al. | Dec. 24, 1957 |

OTHER REFERENCES

Jones et al.: Am. Chem. Soc., 49, pages 1538, 1531 (1927).